United States Patent Office 3,458,397
Patented July 29, 1969

3,458,397
PROCESS FOR PRODUCING OSTEOGENIC MATERIAL
Dirck V. Myers, Princeton, Guy T. Barry, Skillman, Alek Borman and Robert C. Millonig, East Brunswick, Wayne L. Westcott, Nixon, and Mary B. Young, Dayton, N.J., assignors to E. R. Squibb & Sons, Inc., New York, N.Y., a corporation of Delaware
No Drawing. Filed Dec. 8, 1966, Ser. No. 600,023
Int. Cl. C07g 7/00; A61k 17/00
U.S. Cl. 195—2          9 Claims

ABSTRACT OF THE DISCLOSURE

This invention relates to a process for producing osteogenic material from animal bone tissue. The process comprises treating ground cancellous bone with pepsin in acid solution and subjecting the digested material to a series of extraction and precipitation steps, then freeze drying the extract. A suspension of the dried extract in suitable physiological medium promotes bone formation in vivo in animal hosts when injected at sites of bone defects or disorders along the periosteal membrane of bone.

BRIEF SUMMARY OF THE INVENTION

The process of this invention involves a method of treating bone from animal sources to extract osteogenic material suitable for injecting into an intact animal for the purpose of inducing bone formation at the injection site. The process comprises digesting washed bone with pepsin in aqueous acid medium and treating the liquid extract with a water miscible organic solvent. The precipitate is recovered, washed and dried.

The dried material constitutes an extract of the bone substance which promotes bone growth.

DETAILED DESCRIPTION

The bone from which the osteogenic material of this invention is derived is obtained from immature mammalian sources, especially bovine, equine, ovine or porcine sources, preferably calf bone. Cancellous bone is the preferred material. This is subjected to a treatment which comprises essentially digestion with pepsin in aqueous acid medium, precipitation of material from the liquid extract with a water miscible organic solvent, preferably a lower aliphatic alcohol. The precipitate, suspended in water, is neutralized with alkali and freeze dried.

The amount of osteogenic material produced and the osteogenic activity are materially increased by including certain additional operations and by observing certain conditions of operation. The complete cycle of operations and conditions are set forth in the following description of the preferred modification and optimum conditions.

The bone is cut into slices and ground into particles of the order of about 2 to about 15 mm. in size. The ground bone is preferably first washed with a saline solution which may contain a bactericidal agent. Salts such as sodium chloride, potassium chloride or calcium chloride, etc., may be used. The first is preferred. Bactericides which may be used include, for example, toluene, thymol, β-propiolactone or the like.

The saline solution may have a concentration from about 0.1% (w./v.) to saturation. The preferred aqueous sodium chloride solution is employed in a concentration of about 0.8 to 15% (w./v.). A concentration of about 15% gives good results. About 1 to 5, preferably about 2.5, liters of solution per kilogram of bone material may be used. It is desirable to reduce the serum and other extractable proteins in the bone until the wash contains no more than 0.1 mg. of protein/ml. The washing may be repeated one or more times.

The sodium chloride washed bone may then, if desired, be again washed one or more times with distilled water.

This optional treatment is effected at a reduced temperature of about −5° to 15° C., preferably at about 0° to 5° C., although it is possible to operate as high as about 25° C., The ground cancellous bone, whether washed as just described or in the freshly ground state, is subjected to digestion with pepsin or any other proteolytic enzymes active between pH 2.0 to 5.0. This pepsin treatment is effected in aqueous medium at an acid pH.

The pH should be kept within the range of about 2.0 to 5. The pH tends to fluctuate during the pepsin digestion step and we have found this to be desirable. The preferred procedure is to adjust the pH to about 2.5, e.g. with a dilute mineral acid such as hydrochloric acid, then readjust the pH to about 2.5 from time to time.

For the pepsin treatment the ground bone is suspended in aqueous acid solution, e.g., about 2.5 liters/kg. of bone. To this suspension is added a solution of pepsin dissolved in water. The dissolved pepsin is added to 1 kg. of bone so that there is about 1 to about 20 gm. of purified pepsin containing 10,000 proteolytic units/gm. This operation, under moderate agitation, is continued for a period of about 1 to about 48 hours, preferably 9 hours or longer, depending upon degree of agitation.

The extract is now separated from the solid residue, e.g., by filtration or centrifugation. This extract, which may still be turbid, can be further clarified by repeated filtration or centrifugation.

Each of the foregoing steps, except the salt washing, may be effected at a somewhat elevated temperature, e.g., up to about 50° C., although it may be done at ambient temperature, down to about 20° C. A preferred range is 35° to 45° C.

Following the pepsin treatment, the liquid extract from that step is subjected to precipitation with a water miscible organic solvent such as acetone, glycols, e.g., ethylene glycol and especially lower aliphatic alcohols, preferably ethanol. From this point on, best results are obtained by operating at a reduced temperature preferably below about 15° C., especially within the range of about 10° to about 0° C., with about 4° C. being the most desirable.

The alcohol precipitation is carried out in aqueous medium at an acid pH in the range of about 2.0 to 3.5, preferably 2.5. Alcohol is added to the extract from the pepsin digestion until an alcohol concentration within the range of about 20% to about 60% v./v., preferably 20% to 40%, is attained. An alcohol concentration of about 30% gives best results. The extracted material is maintained in contact with the alcohol for a period of about 12 to about 24 hours. Longer contact of 2 to 5 days increases the weight yield but lowers potency.

During the processing with pepsin and then with alcohol, the pH should not exceed 7.

The alcohol precipitated material is separated, e.g., by filtration or centrifugation. This precipitate is the desired product and is dried, preferably freeze dried.

Best results are obtained, however, by washing the alcohol precipitate itself at about a neutral pH before or after drying with aqueous solvents and then freeze drying. It is sometimes desirable to repeat the wash several times by slurrying the solids in water at neutral pH, centrifuging, reslurrying in water and centrifuging again prior to freeze drying. In addition treatment of the washed product with defatting solvents such as chloroform-methanol mixtures at ambient temperatures or lower, preferably 4° C. may be desirable to further improve the product.

The dry extract thus obtained in powder form may be stored in sterile vials for later use. Preferably the freeze dried material is immediately packed in the sterile vial under an inert atmosphere such as nitrogen and sealed until required for use.

For use, the dry extract is preferably suspended in sterile physiological saline, e.g., about 5 to about 60 mg./ml. This is administered by injection into the area immediately adjacent or surrounding the site in the animal host at which it is desired to promote or stimulate bone growth, for example, at the site of bone implants, fractures or in various metabolic bone defects (osteroporosis) or application to the periodontal tissue. In general, about 1 to about 30 mg. of osterogenic material per kg. of body weight is injected. This may be repeated one or more times as required.

The osterogenic material is assayed for activity by the rat leg assay described in the example below.

EXAMPLE

Salt extraction

This operation is performed at 4° C. Finely ground cancellous bone is suspended in 15% NaCl (w./v.) (2.5 l./kg. bone) and agitated for 2 hours. The solvent is removed by filtration of the suspension through cheesecloth and by expressing the remaining liquid from the bone residue. A second extraction is performed on the residue for 4 hours. A third extraction is performed on the residue for 18 hours. The three 15% NaCl extracts are discarded.

Acid-pepsin extraction

Acid-pepsin extraction is performed at 37° C. with constant agitation at a rate of 150 cycles/min. The vessel is open only during adjustments of pH. The pH is lowered at intervals to 2.5 using 6 N HCl during the 45 hr. extraction.

The washed bone is suspended in distilled water (2.5 l./kg. wet bone) and stirred for 15 min. at 37° C. The pH is maintained at 2.5 for 15 min. with 6 N HCl. Pepsin (10 gm./kg. of washed bone, equivalent to 100,000 proteolytic units/kg. washed bone) is dissolved in 250 ml. distilled water and added.

Clarification of extract

After digestion with pepsin for 45 hours, the extraction is separated from the residue by filtration through cheesecloth and the remaining extract is expressed from the residue. The weight of residue is roughly half that of the washed bone prior to extraction. The turbid extract is then centrifuged ½ hr. at 1200×g at 25° C. The upper lipid layer together with a solid interface is aspirated off and discarded, and the remaining turbid extract is filtered (gravity) through coarse filter paper. The pH of the extract is adjusted to 2.5 with 6 N HCl, and the temperature lowered to 4° C.

Alcohol precipitation

To the clarified extract at pH 2.5 and at 4° C., is added, with stirring, 0.45 volume per volume of extract of 95% ethanol (30% v./v.) precooled to −18°. The ethanol is added over a period of one minute and stirring is continued for an additional 2 min. The suspension is stored at 4° C., overnight (ca. 20 hrs.)

Work-up of precipitate

The alcohol suspension is centrifuged at 4° C. at 13,000×g for ½ hr. and the supernatant discarded. The precipitate is slurried in distilled water at 25° C. An approximate volume of 75 ml. water is used for the amount of precipitate resulting from extraction of 200 g. washed bone. The pH of the slurry is about 3 and adjusted to 6.5–7.0 using 10% sodium hydroxide. The slurry is freeze dried.

Assay of material

The osterogenic material is assayed by suspending a 60 mg. sample in 1 ml. of physiological saline and the pH is adjusted within the range of 6 to 7.

The osteogenic material thus suspended is injected (0.1 ml., 6 mg. dose) along the periosteal surface of the radius-ulna complex of male rats weighing 180–200 g. The contralateral radius-ulna complex serves as the control. The rats are maintained for one week at which time 2 $\mu$curies of radioactive $Sr^{85}$, preferably as $Sr^{85}$ nitrate, is injected intrathoracially. On the following day the animals are sacrificed and the $Sr^{85}$ content of the treated and control radius-ulna complex is measured. The assay depends upon the enhanced ability of newly formed bone (matured osteoid) to bind $Sr^{85}$ in addition to that bound by the preexisting bone. The extent of bone growth induced within the week by osteogenic material is determined by calculating the difference in uptake of $Sr^{85}$ as calculated by the following expression:

$$\frac{Sr^{85} \text{ content of treated radius-ulna complex}}{Sr^{85} \text{ content of control radius-ulna complex}} \times 100$$

A value of 100 corresponds to no excess incorporation of $Sr^{85}$ in the treated complex as compared with the control. Values above 100 give a measure of degree of octeogenic potency of the materials per mg. of dose injected.

What is claimed is:

1. A process for producing osteogenic material which comprises digesting ground animal bone with pepsin in aqueous acid medium, separating the liquid from the solid residue, precipitating the insoluble portion from the liquid extract with acetone, glycols or lower aliphatic alcohol, water washing the precipitate and drying the solids to dry particulate form.

2. A process as in claim 1 wherein the acid medium is at a pH of about 2.0 to 3.5.

3. A process as in claim 2 wherein the solvent is a lower aliphatic alcohol.

4. A process for producing osteogenic material from animal bone which comprises digesting particulate cancellous bone with pepsin in aqueous acid medium, separating the extract from the solid residue, precipitating an insoluble portion from the extract with a lower aliphatic alcohol, separating and water washing the precipitate, then freeze drying the washed precipitate.

5. A process as in claim 4 wherein the alcohol is ethanol.

6. A process as in claim 5 wherein the pepsin digestion and the alcohol precipitation steps are carried out at a pH in the range of about 2.0 to 3.5.

7. A process as in claim 6 wherein the procedure beginning with the alcohol precipitation step is at a temperature below about 15° C.

8. A process for producing osteogenic material from animal bone which comprises extracting ground cancellous bone with about 1 to about 20 gm. of pepsin per kg. of bone in aqueous acid medium at about pH 2.5, separating the extract, precipitating an insoluble portion from the extract with ethanol at about pH 2.5 and at a temperature from 0° to 15° C., separating the insoluble material from the ethanol solution, washing the insoluble material with water and then freeze drying the water washed insoluble material.

9. A process as in claim 8 wherein the cancellous bone is washed with an aqueous sodium chloride solution prior to treatment with pepsin.

References Cited

UNITED STATES PATENTS

| 2,968,593 | 1/1961 | Rapkin | 167—74 |
| 3,318,774 | 5/1967 | Dingwall et al. | 167—74 |

FRANK CACCIAPAGLIA, Jr., Primary Examiner

U.S. Cl. X.R.

424—95